United States Patent
Hu

(10) Patent No.: US 9,503,369 B2
(45) Date of Patent: Nov. 22, 2016

(54) NICKNAME AND TRANSPARENT INTERCONNECTION OF LOTS OF LINKS (TRILL) PACKET PROCESSING METHOD AND APPARATUS

(71) Applicant: ZTE CORPORATION, Shenzhen, Guangdong Province (CN)

(72) Inventor: Fangwei Hu, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 0 days.

(21) Appl. No.: 14/407,382

(22) PCT Filed: May 28, 2013

(86) PCT No.: PCT/CN2013/076355
§ 371 (c)(1),
(2) Date: Dec. 11, 2014

(87) PCT Pub. No.: WO2013/185532
PCT Pub. Date: Dec. 19, 2013

(65) Prior Publication Data
US 2015/0139234 A1  May 21, 2015

(30) Foreign Application Priority Data

Jun. 13, 2012  (CN) .......................... 2012 1 0194070

(51) Int. Cl.
*H04L 12/741* (2013.01)
*H04L 29/12* (2006.01)
(Continued)

(52) U.S. Cl.
CPC ............... *H04L 45/74* (2013.01); *H04L 12/46* (2013.01); *H04L 45/66* (2013.01); *H04L 61/3015* (2013.01)

(58) Field of Classification Search
CPC ... H04L 45/66; H04L 61/3015; H04L 45/74; H04L 12/46
See application file for complete search history.

(56) References Cited

U.S. PATENT DOCUMENTS

2011/0019678 A1   1/2011  Mehta et al. ................. 370/401
2012/0281706 A1*  11/2012  Agarwal ............. H04L 67/1002
                                              370/395.53
(Continued)

FOREIGN PATENT DOCUMENTS

| CN | 102075446 A | 5/2011 |
| CN | 102307144 A | 1/2012 |
| CN | 102447635 A | 5/2012 |

OTHER PUBLICATIONS

International Search Report (Form PCT/ISA/210) for PCT/CN2013/076355 mailed Sep. 5, 2013.

*Primary Examiner* — Brian D Nguyen
(74) *Attorney, Agent, or Firm* — Koppel, Patrick, Heybl & Philpott

(57) ABSTRACT

Provided are a nickname and a transparent interconnection of lots of links (TRILL) packet processing method and apparatus. The method includes: a routing bridge (RB) in a TRILL network allocating a nickname to a terminal attached to the RB, the nickname being used for forwarding a packet in the TRILL network; and the RB sending the allocated nickname to the terminal, the terminal encapsulating, according to the nickname, a TRILL packet which uses a fine grained label to distinguish a multi-tenant service. By means of the solution, the problems of cumbersome design and low processing efficiency for implementing multi-tenancy in the related art caused by additional format conversion and label mapping processes required for implementing fine grained distinguishing of multiple tenants are solved, thereby achieving an effect that fine grained distinguishing of multi-tenant services is implemented by TRILL nickname based peer-to-peer forwarding, saving the additional processes and improving the processing efficiency.

10 Claims, 5 Drawing Sheets

(51) Int. Cl.
*H04L 12/46* (2006.01)
*H04L 12/721* (2013.01)

(56) References Cited

U.S. PATENT DOCUMENTS

| | | | |
|---|---|---|---|
| 2013/0003733 A1* | 1/2013 | Venkatesan | H04L 12/4625 370/390 |
| 2013/0003738 A1* | 1/2013 | Koganti | H04L 61/103 370/392 |
| 2013/0003747 A1* | 1/2013 | Raman | H04L 45/745 370/401 |
| 2013/0060929 A1* | 3/2013 | Koponen | H04L 12/4633 709/224 |
| 2013/0188521 A1* | 7/2013 | Jain | H04L 12/185 370/255 |
| 2013/0195111 A1* | 8/2013 | Allan | H04L 12/462 370/395.53 |
| 2013/0291127 A1* | 10/2013 | Bergman | G06F 17/30 726/30 |
| 2013/0301642 A1* | 11/2013 | Radhakrishnan | H04L 45/66 370/392 |

* cited by examiner

NICKNAME AND TRANSPARENT INTERCONNECTION OF LOTS OF LINKS (TRILL) PACKET PROCESSING METHOD AND APPARATUS

TECHNICAL FIELD

The disclosure relates to the field of communication, in particular to a nickname and a transparent interconnection of lots of links (TRILL) packet processing method and apparatus.

BACKGROUND

Transparent interconnection of lots of links (TRILL) is a technology merging a variety of advantages, for example: the TRILL technology uses an ISIS link-state routing protocol to calculate the topology of a two-layer network, thus solving the problem that the path of the two-layer network cannot be fully used due to the fact that the operation of an STP (spanning tree protocol) in the two-layer bridge needs to block some links; besides, the load balance of the link is provided through the algorithm of ECMP (equal-cost multi-path); the TRILL protocol uses methods such as the shortest path idea of the route and hop count to solve the problem of loop, and further avoid a sharp network oscillation after failure under the STP condition, moreover, the idea of distribution tree is used to solve the problem of multicast and broadcast deliver; and the process of a multicast packet is ensured and simplified by means of manners such as pruning of a routing protocol, and backward path detection. There is an ingress RBridge (ingress routing bridge) at the ingress of the TRILL network to complete the TRILL encapsulation of the original data, the unicast data is forwarded along the shortest path calculated by the SPF algorithm, multicast or broadcast data are forwarded to a plurality of egresses along a distribution tree, and there is an egress RBridge (egress routing bridge) at the egress of the TRILL network to complete the de-encapsulation of the TRILL data.

With the development of a cloud data center, it requires to perform fine grained distinguishing of multi-tenant services on the service; however, the traditional method of using VLAN to distinguish the tenant services cannot meet the requirements. In related art, a method of using a PBB technology to realize the fine grained distinguishing of multiple tenants is also provided. In the PBB technology, I-SID is used to realize the distinguishing to the service of multiple tenants; however, the encapsulation formats of the PBB and the TRILL are different, when a PBB packet is forwarded to an ingress RBridge device, the package format conversion and label mapping processes are required to be performed, for example, the mapping of an I-SID identification to a fine grained label of the TRILL needs to be performed; therefore, an additional control plane mechanism is required to complete the publish and update of mapping information.

Therefore, additional format conversion and label mapping processes are required for implementing fine grained distinguishing of multiple tenants in related art, therefore, the design is cumbersome, and the processing efficiency for implementing multi-tenancy is low.

SUMMARY

The embodiments of the disclosure provide a nickname and a transparent interconnection of lots of links (TRILL) packet processing method and apparatus so as to at least solve the problems of cumbersome design and low processing efficiency for implementing multi-tenancy in the related art caused by additional format conversion and label mapping processes required for implementing fine grained distinguishing of multiple tenants.

According to one embodiment of the disclosure, provided is a nickname processing method, including: a routing bridge (RB) in a transparent interconnection of lots of links (TRILL) network allocating a nickname to a terminal attached to the RB, the nickname being used for forwarding a packet in the TRILL network; and the RB sending the allocated nickname to the terminal, the terminal encapsulating, according to the nickname, a TRILL packet which uses a fine grained label to distinguish a multi-tenant service.

The RB in the TRILL network allocating the nickname to the attached terminal includes: the RB acquiring a nickname which is being used by the RB itself; and the RB allocating the acquired nickname which is being used by the RB itself to the attached terminal.

After the RB allocating the nickname to the attached terminal, the method further includes: the RB receiving a TRILL packet from a remote end; the RB judging whether a nickname in the received TRILL packet is the nickname which is being used by the RB itself, and whether a destination medium access control (MAC) address field in an inner Ethernet packet header in the received TRILL packet is one of the MAC addresses of the terminal attached to the RB; and on the condition that the judging result is yes, the RB forwarding the received TRILL packet to the terminal attached to the RB.

According to another embodiment of the disclosure, provided is a transparent interconnection of lots of links (TRILL) packet processing method, including: a terminal receiving a nickname allocated by a routing bridge (RB) in the TRILL network to the terminal, the nickname being used for forwarding a packet in the TRILL network; and the terminal encapsulating, according to the received nickname, a TRILL packet which uses a fine grained label to distinguish a multi-tenant service.

The terminal encapsulating, according to the received nickname, the TRILL packet which uses the fine grained label to distinguish the multi-tenant service includes: the terminal encapsulating in the TRILL packet a packet header corresponding to a link type according to the link type of a link between the terminal and the RB, the packet header corresponding to the link type being used for forwarding a packet in the link between the terminal and the RB.

The terminal receiving the nickname allocated by the RB in the TRILL network to the terminal includes: the terminal receiving the nickname which is allocated by the RB to the terminal and being used by the RB itself.

According to still another embodiment of the disclosure, provided is a nickname processing apparatus, the apparatus is located in a routing bridge (RB) in a transparent interconnection of lots of links (TRILL) network and includes: a first allocation component, configured to allocate a nickname to a terminal attached to the RB, the nickname being used for forwarding a packet in the TRILL network; and a first sending component, configured to send the allocated nickname to the terminal, wherein the terminal encapsulates, according to the nickname, a TRILL packet which uses a fine grained label to distinguish a multi-tenant service.

The first allocation component includes: a first acquisition component, configured to acquire a nickname which is being used by the RB itself; and a second allocation component, configured to allocate the acquired nickname which is being used by the RB itself to the attached terminal.

The apparatus further includes: a first receiving component, configured to receive a TRILL packet from a remote end; a first judgment component, configured to judge whether a nickname in the received TRILL packet is the nickname which is being used by the RB itself, and whether a destination medium access control (MAC) address field in an inner Ethernet packet header in the received TRILL packet is one of the MAC addresses of the terminal attached to the RB; and a first forwarding component, configured to forward the received TRILL packet to the terminal attached to the RB on the condition that the judging result is yes.

According to still another embodiment of the disclosure, provided is a transparent interconnection of lots of links (TRILL) packet processing apparatus, including: a second receiving component, configured to receive a nickname allocated by a routing bridge (RB) in the TRILL network to the terminal, the nickname being used for forwarding a packet in the TRILL network; and a first encapsulating component, configured to perform encapsulation according to the received nickname to use a fine grained label to distinguish a TRILL packet of a multi-tenant service.

By means of the embodiments of the disclosure, a routing bridge (RB) in a transparent interconnection of lots of links (TRILL) network is used to allocate a nickname to a terminal attached to the RB, the nickname being used for forwarding a packet in the TRILL network; and the RB sends the allocated nickname to the terminal, the terminal encapsulates, according to the nickname, a TRILL packet which uses a fine grained label to distinguish a multi-tenant service. In this way, the problems of cumbersome design and low processing efficiency for implementing multi-tenancy in the related art caused by additional format conversion and label mapping processes required for implementing fine grained distinguishing of multiple tenants are solved, thereby achieving an effect that fine grained distinguishing of multi-tenant services is implemented by TRILL nickname based peer-to-peer forwarding, saving the additional processes and improving the processing efficiency.

BRIEF DESCRIPTION OF THE DRAWINGS

Drawings, provided for further understanding of the disclosure and forming a part of the specification, are used to explain the disclosure together with embodiments of the disclosure rather than to limit the disclosure. In the drawings.

DETAILED DESCRIPTION OF THE EMBODIMENTS

The disclosure is described below with reference to the accompanying drawings and embodiments in detail. Note that, the embodiments of the disclosure and the features of the embodiments can be combined with each other if there is no conflict.

Figure 1:
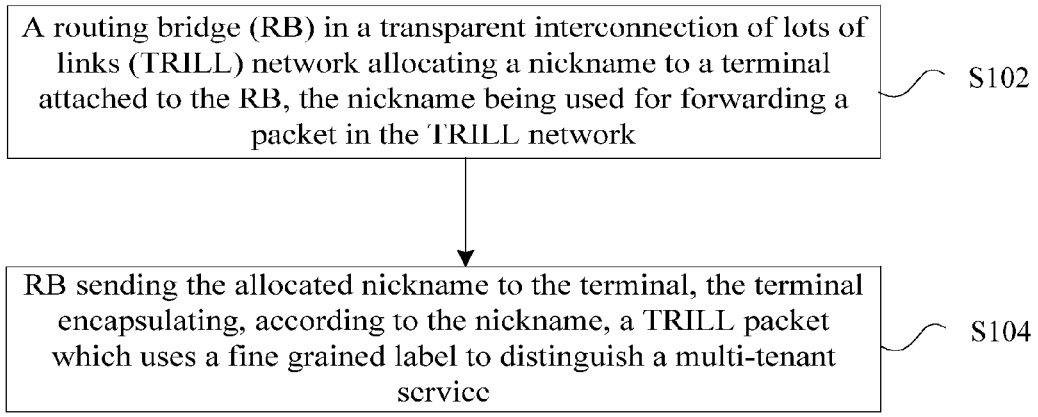
FIG. 1 is a flowchart of a nickname processing method according to an embodiment of the disclosure.

A nickname processing method is provided in the present embodiment. FIG. 1 is a flowchart of a nickname processing method according to an embodiment of the disclosure. As shown in FIG. 1, the flow includes the following steps:

step S102, a routing bridge (RB) in a transparent interconnection of lots of links (TRILL) network allocates a nickname to a terminal attached to the RB, the nickname being used for forwarding a packet in the TRILL network;

and step S104, RB sends the allocated nickname to the terminal, and the terminal encapsulates, according to the nickname, a TRILL packet which uses a fine grained label to distinguish a multi-tenant service.

By means of the above-mentioned steps, at the routing bridge side, the TRILL nickname is allocated and sent to the terminal through the network bridge RB. A terminal supporting TRILL packet encapsulation encapsulates the TRILL packet according to the allocated and sent nickname Since the TRILL protocol supports a fine grained label capacity, the fine grained label is used in the encapsulated TRILL packet to implement the distinguishing of the multi-tenant service. Compared with the manner of using I-SID to implement the distinguishing of the multi-tenant service in a related art, which results in the problems of cumbersome design and low processing efficiency are caused by the packet format conversion and label mapping processes, using TRILL nickname based peer-to-peer forwarding not only solves the problems of cumbersome design and low processing efficiency for implementing multi-tenancy in the related art, but also saves the additional processes and improves the processing efficiency.

In the process that the RB in the TRILL network allocates a nickname to a terminal attached to the RB, the nickname of the RB may be allocated to the terminal attached to the RB. For example, after the RB acquires a nickname which is being used by the RB itself, the required nickname which is being used by the RB itself is allocated to the attached terminal. The space for the nickname can be saved by allocating and sending the nickname which is being used by the RB itself to the attached terminal.

After the RB sends the allocated nickname to the terminal, when the RB receives a TRILL packet from a remote end, the RB judges whether the nickname in the TRILL packet is the nickname which is being used by the RB itself, and whether the destination medium access control (MAC) address field in an inner Ethernet packet header in the TRILL packet is one of the MAC addresses of the terminal attached to the RB. On the condition that the judging result is yes, the RB forwards the TRILL packet to the terminal attached to the RB corresponding to the MAC address in the TRILL packet, thereby achieving the fast peer-to-peer forwarding of the TRILL packet.

Figure 2:
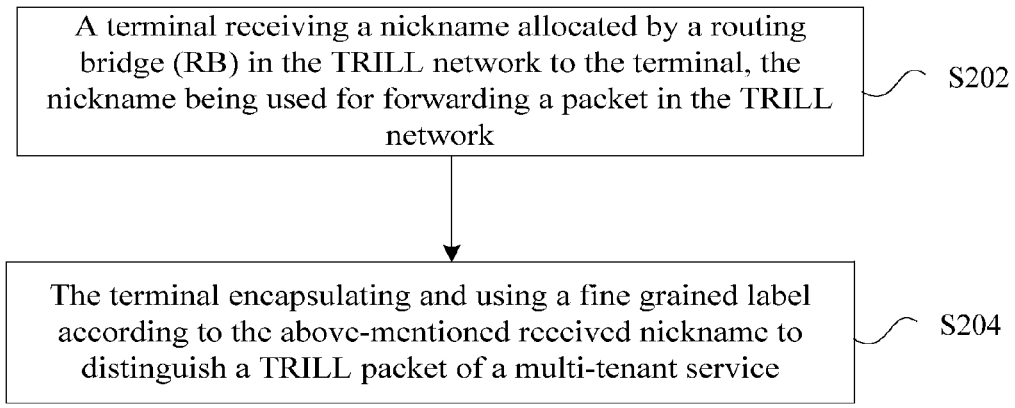
FIG. 2 is a flowchart of a transparent interconnection of lots of links (TRILL) packet processing method according to an embodiment of the disclosure.

A transparent interconnection of lots of links (TRILL) packet processing method is also provided in the present embodiment. FIG. 2 is a flowchart of a transparent interconnection of lots of links (TRILL) packet processing method according to an embodiment of the disclosure. As shown in FIG. 2, the flow includes the following steps:

step S202, a terminal receives a nickname allocated by a routing bridge (RB) in the TRILL network to the terminal, the nickname being used for forwarding a packet in the TRILL network, in an example embodiment, in order to save the space of the nickname, the nickname received by the terminal also may be a nickname which is being used by the RB itself;

and step S204, the terminal encapsulates, according to the above-mentioned received nickname, a TRILL packet which uses a fine grained label to distinguish a multi-tenant service.

By means of the above-mentioned steps, at the terminal side, a TRILL nickname is allocated and sent to the terminal through the network bridge RB. A terminal supporting TRILL packet encapsulation encapsulates the TRILL packet according to the allocated and sent nickname Since the TRILL protocol supports a fine grained label capacity, the fine grained label is used in the encapsulated TRILL packet to implement the distinguishing of the multi-tenant service. Compared with the manner of using I-SID to implement the distinguishing of the multi-tenant service in the related art, which results in the problems of cumbersome design and low processing efficiency are caused by the packet format conversion and label mapping processes, using TRILL nickname based peer-to-peer forwarding not only solves the problems of cumbersome design and low processing efficiency for implementing multi-tenancy in the related art, but also saves the additional processes and improves the processing efficiency.

In addition, it should be noted that when the terminal encapsulates, according to the received nickname, a TRILL packet which uses a fine grained label to distinguish a multi-tenant service, the terminal may encapsulate in the TRILL packet, according to a link type of a link between the terminal and the RB, a packet header corresponding to this link type, the packet header corresponding to the link type being used for forwarding a packet in the link between the terminal and RB. For example, if the link between the terminal and the RB is an Ethernet link, the packet header which is encapsulated by the terminal in the TRILL packet is an Ethernet packet header; and when the link between the terminal and the RB is other links, the packet header which is encapsulated by the terminal in the TRILL packet is a packet header of other links Such an encapsulation is used for achieving the fast packet forwarding between the terminal and the routing bridge in the TRILL network.

A nickname and transparent interconnection of lots of links packet processing apparatus is also provided in the present embodiment. The apparatus is used for realizing the above-mentioned embodiments and example implementation, with no further description for what has been described. As used below, the term "component" can realize the combination of software and/or hardware with predetermined functions. Although the apparatus described in the following embodiment is achieved preferably by software; however, hardware or the combination of software and hardware also can be possible and contemplated.

Figure 3:
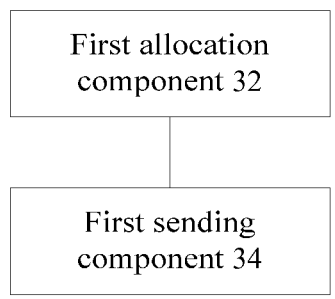
FIG. 3 is a structural block diagram of a nickname apparatus according to an embodiment of the disclosure.

FIG. 3 is a structural block diagram of a nickname apparatus according to the embodiment of the disclosure. As shown in FIG. 3, the apparatus is located in a routing bridge (RB) in a transparent interconnection of lots of links (TRILL) network and includes a first allocation component 32 and a first sending component 34, and the apparatus is described below.

The first allocation component 32 is configured to allocate a nickname to the terminal attached to the RB, the nickname being used for forwarding a packet in the TRILL network; the first sending component 34 is coupled to the above-mentioned first allocation component 32 and is configured to send the above-mentioned allocated nickname to the terminal, wherein the terminal encapsulates, according to the above-mentioned nickname, a TRILL packet which uses a fine grained label to distinguish a multi-tenant service.

Figure 4:
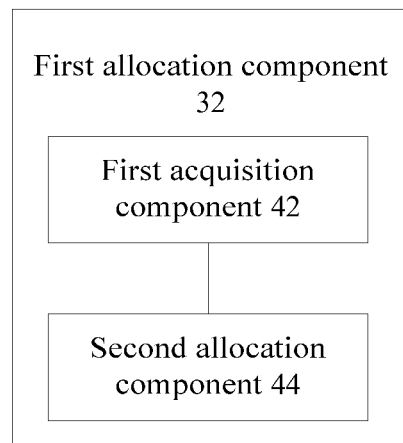
FIG. 4 is a structural block diagram of a first allocation component 32 in a nickname apparatus according to an embodiment of the disclosure.

FIG. 4 is a structural block diagram of a first allocation component 32 in a nickname apparatus according to an embodiment of the disclosure. As shown in FIG. 4, the first allocation component 32 includes a first acquisition component 42 and a second allocation component 44, and the allocation component 32 will be described below.

The first allocation component 42 is configured to acquire a nickname which is being used by the RB itself; and the second allocation component 44 is coupled to the above-mentioned first allocation component 42 and is configured to allocate the acquired nickname which is being used by the RB itself to the attached terminal.

Figure 5:
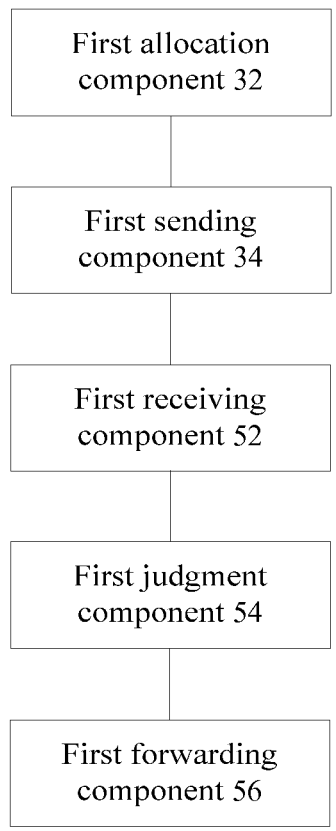
FIG. 5 is a structural block diagram of a nickname processing apparatus according to an example embodiment of the disclosure.

FIG. 5 is a structural block diagram of a nickname processing apparatus according to an example embodiment of the disclosure. As shown in FIG. 5, besides including all the components as shown in FIG. 3, the apparatus also includes a first receiving component 52, a first judgment component 54 and a first forwarding component 56, and the preferred apparatus will be described below.

The first receiving component 52 is configured to receive a TRILL packet from a remote end; the first judgment component 54 is coupled to the above-mentioned first receiving component 52 and is configured to judge whether the nickname in the received TRILL packet is the nickname which is being used by the RB itself, and whether the destination medium access control (MAC) address field in an inner Ethernet packet header in the received TRILL packet is one of the MAC addresses of the terminal attached to the RB; and the first forwarding component 56 is coupled to the above-mentioned first judgment component 54 and is configured to forward the received TRILL packet to the terminal attached to the RB on the condition that the judging result is yes.

Figure 6:
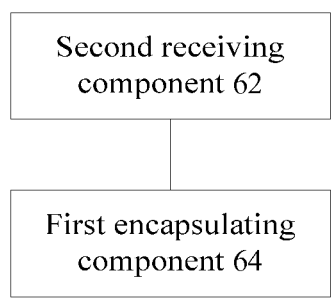
FIG. 6 is a structural block diagram of a transparent interconnection of lots of links (TRILL) packet processing apparatus according to an embodiment of the disclosure.

FIG. 6 is a structural block diagram of a transparent interconnection of lots of links (TRILL) packet processing apparatus according to an embodiment of the disclosure. As shown in FIG. 6, the apparatus is located in the terminal and includes a second receiving component 62 and a first encapsulating component 64, and the apparatus is described below.

The second receiving component 62 is configured to receive a nickname allocated by a routing bridge (RB) in the TRILL network to the terminal, the nickname being used for forwarding a packet in the TRILL network; the first encapsulating component 64 is coupled to the above-mentioned second receiving component 62 and is configured to encapsulate, according to the above-mentioned nickname, a TRILL packet which uses a fine grained label to distinguish a multi-tenant service.

In the above-mentioned embodiments and example implementation, based on the feature that the TRILL protocol supports a fine grained label and therefore fine grained distinguishing can be performed on tenant service, a method for multiple tenants of the service in a TRILL network of the data centre is proposed. In the method, the forwarding of the TRILL protocol is deployed on a hypervisor so as to distinguish a multi-tenant service of the hypervisor. Compared with the data transmission performed between the terminal and the routing bridge RBridge using a PBB technology, the method can achieve the peer-to-peer forwarding based on TRILL nickname Therefore, the fine grained distinguishing to the tenant service can be achieved without the mapping of the tenant identification on a boundary RBridge.

In the present embodiment, in order to transfer the data forwarding of the TRILL protocol to the terminal, a nickname value is allocated and sent to the terminal, wherein the terminal supports the TRILL encapsulation based on the fine grained label. In addition, in order to save the space of the nickname, the RBridge allocates and sends the nickname value which is being used by the RB itself to the terminal without allocating and sending a new nickname value to the attached terminal in the present embodiment.

The method for achieving a service multi-tenant in the TRILL network provided by the present embodiment is described below; the method includes the following steps:

S1, a routing bridge allocates a nickname to a terminal attached to this routing bridge, the nickname being a nickname which is being used by the routing bridge, in this way, the space of the nickname can be saved;

S2, the terminal performs TRILL packet encapsulation based on fine grained label, and the ingress nickname field in the TRILL packet header is its own nickname value;

S3, after the routing bridge receives a TRILL packet from the remote end, if the egress nickname is found to be a nickname which is being used by the RB itself, but the MAC address is one of the MAC addresses of the terminal attached to this routing bridge, the TRILL packet is forwarded to this terminal.

Figure 7:
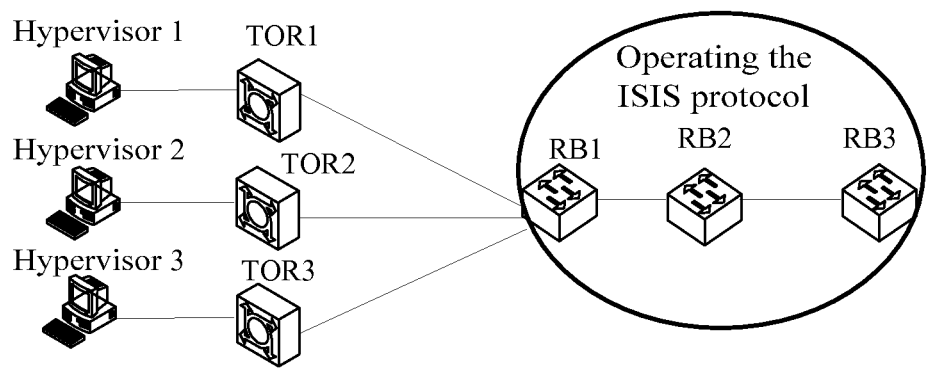
FIG. 7 is a schematic networking diagram of deploying the TRILL in a data center network according to an embodiment of the disclosure.

It should be noted that the terminal Hypervisor is an intelligent terminal. Compared with an ordinary terminal device, this intelligent terminal is capable of encapsulating the TRILL packet. Since the TRILL protocol supports the fine grained label capacity, a fine grained label can be used to distinguish a multi-tenant service. Under normal circumstances, ISIS protocol is not operated on the terminal and ToR, a network topology and a route are not required to be calculated; therefore, an intelligent terminal cannot directly generate, allocate and send the nickname like the routing bridge; and hence, the nickname value of the intelligent terminal needs to be allocated and sent by the routing bridge. In order to save the space of the nickname, when the routing bridge allocates and sends the nickname to the attached intelligent terminal in the present embodiment, the value which is allocated and sent is the nickname value which is being used by the RB itself. FIG. 7 is a schematic networking diagram of deploying the TRILL in a data center network according to an embodiment of the disclosure. As shown in FIG. 7, it is supposed that RB1 uses a nickname N1, then RB1 allocates and sends the Nickname N1 to all of Hypervisor1, Hypervisor2 and Hypervisor3 attached to RB1. When the terminal sends the packet, the allocated nickname value is used for encapsulation, for example, the terminal uses N1 as an ingress nickname for TRILL encapsulation.

Figure 8:
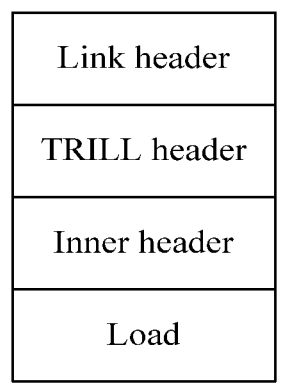
FIG. 8 is a diagram of the format for encapsulating a TRILL packet according to an embodiment of the disclosure.
Figure 9:
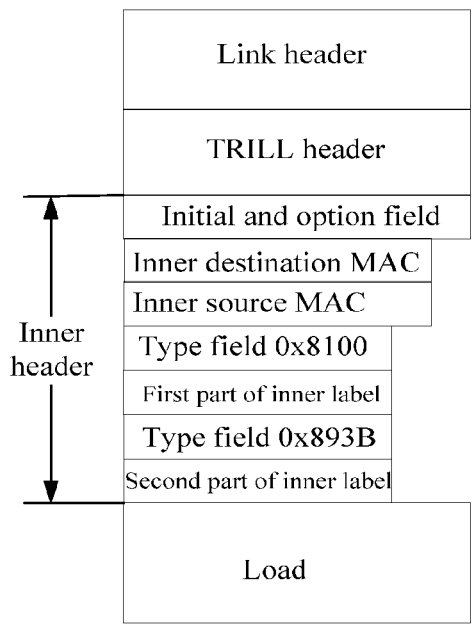
FIG. 9 is a format diagram of using a fine grained label to encapsulate the inner header according to an embodiment of the disclosure.

FIG. 8 is a diagram of the format for encapsulating a TRILL packet according to an embodiment of the disclosure. As shown in FIG. 8, the link header therein is a link encapsulation from the terminal to ingress RB. For example, if the link from the terminal to the ingress RB is an Ethernet link, then the link header of the outermost layer is an Ethernet header, wherein the destination MAC field is an MAC address of RB1, and the source MAC address is one of the MAC addresses of the terminal itself. If the link is of other link types, such as PPP link type, then the encapsulation is performed according to the format defined in RFC6325. The egress Nickname field in the TRILL header (TRILL packet header) is the nickname value of the destination terminal (the egress Nickname field in the TRILL header is the nickname value of the destination terminal if the destination terminal is also an intelligent terminal, otherwise the egress Nickname field in the TRILL header is the nickname of the ingress RB attached by the terminal), and the ingress Nickname field is Nickname N1 of the terminal itself. The inner header is an Ethernet packet header to be sent, in order to achieve the multi-tenant of the service, the inner header uses a fine grained label for encapsulation, the specific encapsulation format is as shown in FIG. 9. FIG. 9 is a format diagram of using a fine grained label to encapsulate the inner header according to an embodiment of the disclosure. As shown in FIG. 9, the inner header includes an initial and option field, an inner destination MAC (6 bytes), an inner source MAC (6 bytes), a type field 0x8100 (2 bytes), a first part of an inner label (2 bytes), a type field 0x893B (2 bytes), a second part of an inner label (2 bytes), a load (payload), a tail field (optional), etc.

The example of realizing data forwarding using a data communication process between two intelligent terminals is described below.

Figure 10:
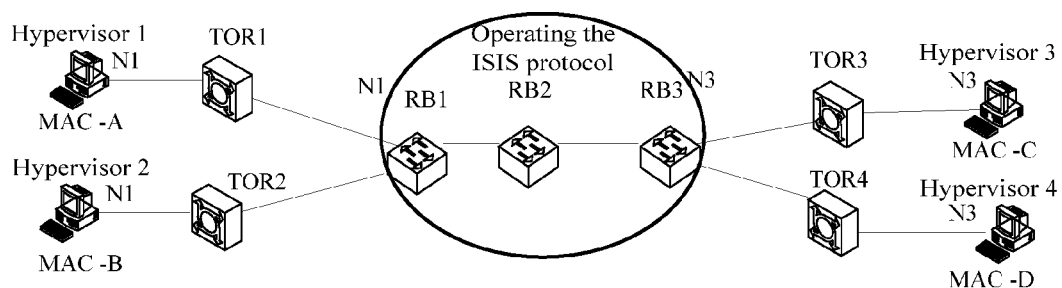
FIG. 10 is a schematic diagram of a network of intelligent terminal communication according to an embodiment of the disclosure.

FIG. 10 is a schematic diagram of a network of intelligent terminal communication according to an embodiment of the disclosure. As shown in FIG. 10, firstly, RB1 allocates nickname N1 which is used by RB1 itself to Hypervisor1 and Hypervisor2, RB3 allocates nickname N3 to Hypervisor3 and Hypervisor4, the MAC address of Hypervisor1 is MAC-A, and the MAC address of Hypervisor3 is MAC-C. The data communication process between Hypervisor1 and Hypervisor3 is described below in combination with FIG. 10. The process includes the following steps.

(1) Hypervisor1 encapsulates the packet according to the data format as shown in FIG. 8. The link Header of the outer layer is an Ethernet packet header, the destination MAC address is an MAC address of RB1, the source MAC is the MAC address of Hypervisor1, the egress Nickname filed in the TRILL Header is N3, and the egress nickname field is N1. The destination MAC address of the inner Ethernet header is MAC-C, the source MAC address is MAC-A, the inner Ethernet header is encapsulated according to the format as shown in FIG. 9. A first part of the inner label and a second part of the inner label are combined to express a fine grained label.

(2) The encapsulated TRILL packet header is forwarded in a network between Hypervisor and RB. Since ToR does not support the encapsulation and forwarding of the TRILL, the network between the Hypervisor and the RB forwards according to the Ethernet packet header of the outer layer. The destination MAC address of the Ethernet packet header of the outer layer is an MAC address of RB1; therefore, the packet may be forwarded to RB1 according to a unicast mode.

(3) After RB1 receives the packet encapsulated by the TRILL, a nickname forwarding table is inquired for forwarding.

(4) The packet is forwarded according to the existing TRILL packet forwarding mechanism in the TRILL network, that is, the packet is forwarded to RB3 after inquiring the nickname according to the egress nickname.

(5) After RB3 receives the packet, the egress nickname is founded to be N3 itself, but the inner destination MAC address is not its own MAC address but is MAC-C, a local MAC address table is inquired, it is found that the packet needs to be sent to a locally attached intelligent terminal Hypervisor3; therefore, the TRILL packet is kept encapsulated, and the TRILL packet is forwarded to the intelligent terminal.

(6) The packet is forwarded between RB3 and the intelligent terminal Hypervisor3 also depending on the packet header of the outer layer.

(7) Hypervisor3 receives the packet, and related de-encapsulation and packet processing are performed.

(8) The flow for forwarding the response packet of Hypervisor3 is the same as the above-mentioned process so as to complete the communication between the intelligent terminals.

It should be noted that if two intelligent terminals, such as Hypervisor1 and Hypervisor2 in the figure, are attached to one and the same RB, in order to achieve the function of the multi-tenant of the service, the communication between the two intelligent terminals also needs to use the TRILL packet encapsulation in the above-mentioned embodiments and example implementation, the forwarding of the packet only depends on the Ethernet packet header of the outer layer without de-encapsulating to the TRILL packet header and without depending on the nickname for forwarding. In addition, in order to reduce the circuitry of the path, when encapsulating the outer layer Ethernet packet header of the RB1 packet, the destination MAC address is directly encapsulated to be an MAC address MAC-B of Hypervisor2.

Obviously, those skilled in the art should know that each of the mentioned components or steps of the disclosure can be realized by universal computing devices; the components or steps can be focused on single computing device, or distributed on the network formed by multiple computing devices; selectively, they can be realized by the program codes which can be executed by the computing device; thereby, the components or steps can be stored in the storage device and executed by the computing device; and under some circumstances, the shown or described steps can be executed in different orders, or can be independently manufactured as each integrated circuit component, or multiple components or steps thereof can be manufactured to be single integrated circuit component, thus to be realized. In this way, the disclosure is not restricted to any particular hardware and software combination.

The descriptions above are only the preferable embodiment of the disclosure, which are not used to restrict the disclosure, for those skilled in the art, the disclosure may have various changes and variations. Any amendments, equivalent substitutions, improvements, etc. within the principle of the disclosure are all included in the scope of the protection as defined in the appended claims of the disclosure.

What is claimed is:

1. A nickname processing method, comprising:
a routing bridge (RB) in a transparent interconnection of lots of links (TRILL) network allocating a nickname to a terminal attached to the RB, the nickname being used for forwarding a packet in the TRILL network;
and the RB sending the allocated nickname to the terminal, the terminal encapsulating, according to the nickname, a TRILL packet which uses a fine grained label to distinguish a multi-tenant service.

2. The method according to claim 1, wherein the RB in the TRILL network allocating the nickname to the attached terminal comprises:
the RB acquiring a nickname which is being used by the RB itself;
and the RB allocating the acquired nickname which is being used by the RB itself to the attached terminal.

3. The method according to claim 1, wherein after the RB allocating the nickname to the attached terminal, the method further comprises:
the RB receiving a TRILL packet from a remote end;
the RB judging whether a nickname in the received TRILL packet is the nickname which is being used by the RB itself, and whether a destination medium access control (MAC) address field in an inner Ethernet packet header in the received TRILL packet is one of MAC addresses of the terminal attached to the RB;
and on the condition that the judging result is yes, the RB forwarding the received TRILL packet to the terminal attached to the RB, keeping the TRILL packet encapsulated.

4. A transparent interconnection of lots of links (TRILL) packet processing method, comprising:
a terminal receiving a nickname allocated by a routing bridge (RB) in a TRILL network to the terminal, the nickname being used for forwarding a packet in the TRILL network;
and the terminal encapsulating, according to the received nickname, a TRILL packet which uses a fine grained label to distinguish a multi-tenant service.

5. The method according to claim 4, wherein the terminal encapsulating, according to the received nickname, the TRILL packet which uses the fine grained label to distinguish the multi-tenant service comprises:
the terminal encapsulating in the TRILL packet a packet header corresponding to a link type according to the link type of a link between the terminal and the RB, the packet header corresponding to the link type being used for forwarding a packet in the link between the terminal and the RB.

6. The method according to claim 4, wherein the terminal receiving the nickname allocated by the RB in the TRILL network to the terminal comprises: the terminal receiving the nickname which is allocated by the RB to the terminal and being used by the RB itself.

7. A nickname processing apparatus, wherein the apparatus is located in a routing bridge (RB) in a transparent interconnection of lots of links (TRILL) network and comprises:
a first allocation component, configured to allocate a nickname to a terminal attached to the RB, the nickname being used for forwarding a packet in the TRILL network;
and a first sending component, configured to send the allocated nickname to the terminal, wherein the terminal encapsulates, according to the nickname, a TRILL packet which uses a fine grained label to distinguish a multi-tenant service.

8. The apparatus according to claim 7, wherein the first allocation component comprises:
a first acquisition component, configured to acquire a nickname which is being used by the RB itself;
and a second allocation component, configured to allocate the acquired nickname which is being used by the RB itself to the attached terminal.

9. The apparatus according to claim 7, further comprising:
a first receiving component, configured to receive a TRILL packet from a remote end;
a first judgment component, configured to judge whether a nickname in the received TRILL packet is the nickname which is being used by the RB itself, and whether a destination medium access control (MAC) address field in an inner Ethernet packet header in the received TRILL packet is one of MAC addresses of the terminal attached to the RB;

and a first forwarding component, configured to forward the received TRILL packet to the terminal attached to the RB on the condition that the judging result is yes, keeping the TRILL packet encapsulated.

10. A transparent interconnection of lots of links (TRILL) packet processing apparatus, comprising:

a second receiving component, configured to receive a nickname allocated by a routing bridge (RB) in a TRILL network to a terminal, the nickname being used for forwarding a packet in the TRILL network;

and a first encapsulating component, configured to perform encapsulation according to the received nickname to use a fine grained label to distinguish a TRILL packet of a multi-tenant service.

* * * * *